United States Patent
Wang (10) Patent No.: US 10,885,568 B2
(45) Date of Patent: Jan. 5, 2021

(54) INTERACTIVE RECOMMENDATION SYSTEM AND METHOD

(71) Applicant: INDUSTRIAL TECHNOLOGY RESEARCH INSTITUTE, Hsinchu (TW)

(72) Inventor: Chieh-Jen Wang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 965 days.

(21) Appl. No.: 15/380,049

(22) Filed: Dec. 15, 2016

(65) Prior Publication Data

US 2018/0137426 A1 May 17, 2018

(30) Foreign Application Priority Data

Nov. 15, 2016 (TW) .............................. 105137251 A (51) Int. Cl.
*G06Q 30/06* (2012.01)
*G06F 16/9535* (2019.01)

(52) U.S. Cl.
CPC ..... *G06Q 30/0631* (2013.01); *G06F 16/9535* (2019.01)

(58) Field of Classification Search
None
See application file for complete search history.

(56) References Cited

U.S. PATENT DOCUMENTS 6,438,579 B1 * 8/2002 Hosken .................. G06Q 30/02
  709/203
7,533,089 B2 * 5/2009 Pan ......................... G06F 40/56
(Continued)

FOREIGN PATENT DOCUMENTS

CN  103955465 A  7/2014
CN  104239571 A  12/2014
(Continued)

OTHER PUBLICATIONS

Chai et al. (Natural Language Assistant: A Dialog System for Online Product Recommendation, Jun. 2002, pp. 63-76) (Year: 2002).*
(Continued)

*Primary Examiner* — George Giroux
(74) *Attorney, Agent, or Firm* — Muncy, Geissler, Olds & Lowe, P.C.

(57) ABSTRACT

An interactive recommendation system and an interactive recommendation method are provided. The interactive recommendation method includes the following steps. Firstly, a server receives a user request from a user device through the Internet. Then, the server analyzes the user request and generates at least one subsidiary request corresponding to the user request. Then, the server issues an interactive request to the user device according to the at least one subsidiary request. The server generates a recommended application program list according to the at least one subsidiary request. After the user device responds to the interactive request, the server recommends at least one application program in the recommended application program list to the user device.

16 Claims, 5 Drawing Sheets

(56) References Cited

U.S. PATENT DOCUMENTS

| | | | |
|---|---|---|---|
| 7,801,885 B1* | 9/2010 | Verma | G06F 16/9535 707/713 |
| 7,860,886 B2* | 12/2010 | Loftesness | G06Q 10/02 707/771 |
| 8,666,909 B2* | 3/2014 | Pinckney | G06Q 30/02 706/11 |
| 8,788,517 B2* | 7/2014 | Horvitz | G06F 16/951 707/759 |
| 9,195,721 B2 | 11/2015 | Soto Matamala et al. | |
| 9,247,014 B1* | 1/2016 | Rao | G06F 16/907 |
| 2006/0064411 A1* | 3/2006 | Gross | G06F 16/90324 |
| 2008/0133504 A1* | 6/2008 | Messer | G06F 16/3325 |
| 2012/0101807 A1* | 4/2012 | Heo | G06F 16/3331 704/9 |
| 2012/0239761 A1 | 9/2012 | Linner et al. | |
| 2012/0258696 A1 | 10/2012 | Nam et al. | |
| 2012/0316955 A1 | 12/2012 | Panguluri et al. | |
| 2013/0325856 A1 | 12/2013 | Soto Matamala et al. | |
| 2015/0242470 A1* | 8/2015 | Ben-Itzhak | G06Q 30/02 707/722 |
| 2016/0140958 A1* | 5/2016 | Heo | G06F 40/30 704/9 |
| 2016/0179816 A1* | 6/2016 | Glover | G06F 16/24578 707/749 |
| 2016/0321347 A1* | 11/2016 | Zhou | G06Q 30/0641 |
| 2017/0132331 A1* | 5/2017 | Pepakayala | H04W 4/60 |
| 2018/0053503 A1* | 2/2018 | Ogunyoku | G10L 25/63 |

FOREIGN PATENT DOCUMENTS

| | | |
|---|---|---|
| CN | 105095388 A | 11/2015 |
| CN | 105426514 | 3/2016 |
| CN | 105574183 A | 5/2016 |
| TW | 201502815 A | 1/2015 |

OTHER PUBLICATIONS

Chai et al. (Comparative Evaluation of a Natural Language Dialog Based System and a Menu Driven System for Information Access: a Case Study, Apr. 2000, pp. 1-12) (Year: 2000).*

Baltrunas et al. (Context relevance assessment and exploitation in mobile recommender systems, Jun. 2012, pp. 507-526) (Year: 2012).*

Hixon et al. (Learning Knowledge Graphs for Question Answering through Conversational Dialog, Jun. 2015, pp. 851-861) (Year: 2015).*

Bin Liu, et al., "Personalized Mobile App Recommendation: Reconciling App Functionality and User Privacy Preference", The *Eighth ACM International Conference on Web Search and Data Mining*, WSDM'15, Feb. 2-6, 2015, Shanghai, China (10 pages).

Peifeng Yin, et al., "App Recommendation: A Contest between Satisfaction and Temptation", In *Proceedings of the sixth ACM international conference on Web search and data mining*, WSDM'13, Feb. 4-8, 2013, Rome, Italy (10 pages).

Ernest Aaron, et al., "Towards a Context-Aware Mobile App Management Framework", In *Proceedings of the 25th Annual International Conference on Computer Science and Software Engineering*, CASCON'15, pp. 236-238, Markham, Canada, Nov. 2-4, 2015.

* cited by examiner

INTERACTIVE RECOMMENDATION SYSTEM AND METHOD

The present application is based on, and claims priority from, Taiwan Application Serial Number 105137251, filed Nov. 15, 2016, the disclosure of which is hereby incorporated by reference herein in its entirety.

TECHNICAL FIELD

Technical field relates to an interactive recommendation system and an interactive recommendation method.

BACKGROUND

Figure 1A:
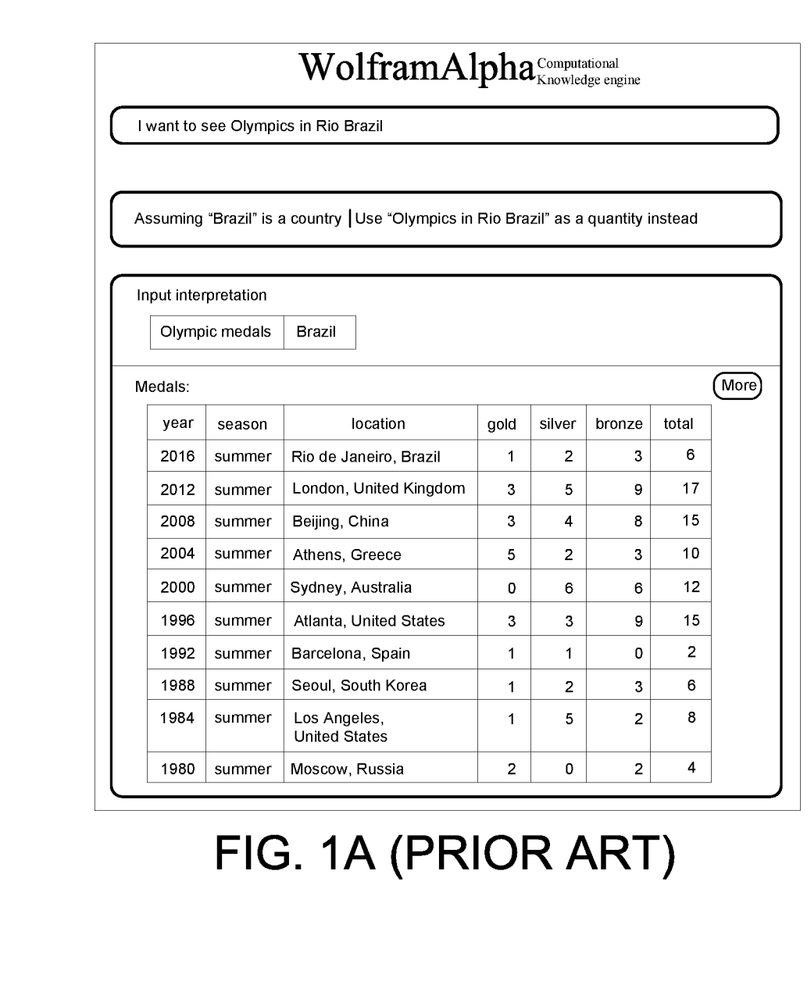
FIGS. 1A and 1B (prior art) schematically illustrate the searched results of the conventional question answering engine and search engine.
Figure 1B:
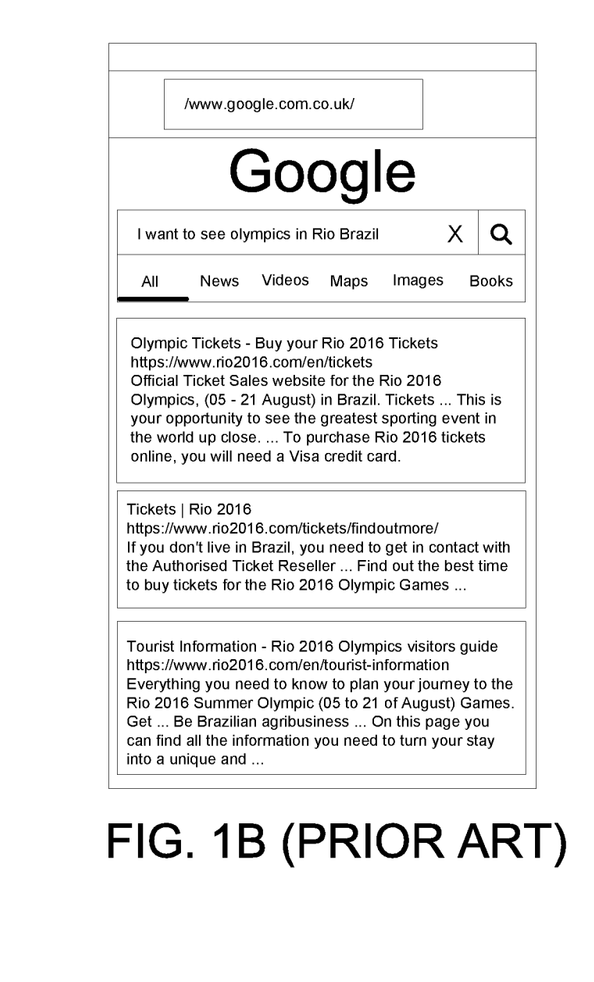

With the rapid development and popularity of the Internet, people have become accustomed to finding information on the websites. Generally, the existing question answering engine (e.g., Wolfram Alpha) or search engine (e.g., Google) is used for performing a one-time information searching operation for a request. If a user's request is more complex, the existing question answering engine or search engine cannot provide accurate and enough related information. For example, if a user intends to Brazil to see the Olympic Games, the user may submit a request "I want to see Olympics in Rio Brazil" to the question answering engine and search engine. The searched results of the question answering engine and search engine are shown in FIGS. 1A and 1B. Generally, the searched results cannot effectively satisfy the user's needs.

Moreover, the existing mobile device is operated through application programs (Apps). If the user's need is more complex, a single application program cannot fully satisfy the user's needs.

Therefore, there is a need of for providing an interactive recommendation system and an interactive recommendation method in order to overcome the above drawbacks.

SUMMARY

The disclosure is directed to an interactive recommendation method for use with a user device and a server. The user device and the server are in communication with the Internet. Firstly, the server receives a user request from the user device through the Internet. Then, the server analyzes the user request and generates at least one subsidiary request corresponding to the user request. Then, the server issues an interactive request to the user device according to the at least one subsidiary request. The server generates a recommended application program list according to the at least one subsidiary request. After the user device responds to the interactive request, the server recommends at least one application program in the recommended application program list to the user device.

According to one embodiment, an interactive recommendation system for use with a user device is provided. The user device is in communication with the Internet. The interactive recommendation system includes an interaction module and a recommendation module. The interaction module in communication with the Internet. The interaction module receives a user request from the user device through the Internet, analyzes the user request, generates at least one subsidiary request corresponding to the user request, and issues an interactive request to the user device according to the at least one subsidiary request. The recommendation module is in communication with the interaction module. The recommendation module generates a recommended application program list according to the at least one subsidiary request. After the user device responds to the interactive request, the recommendation module recommends at least one application program in the recommended application program list to the user device.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

First Embodiment

The disclosure provides an interactive recommendation system in order to overcome the drawbacks of the conventional technologies.

Figure 2:
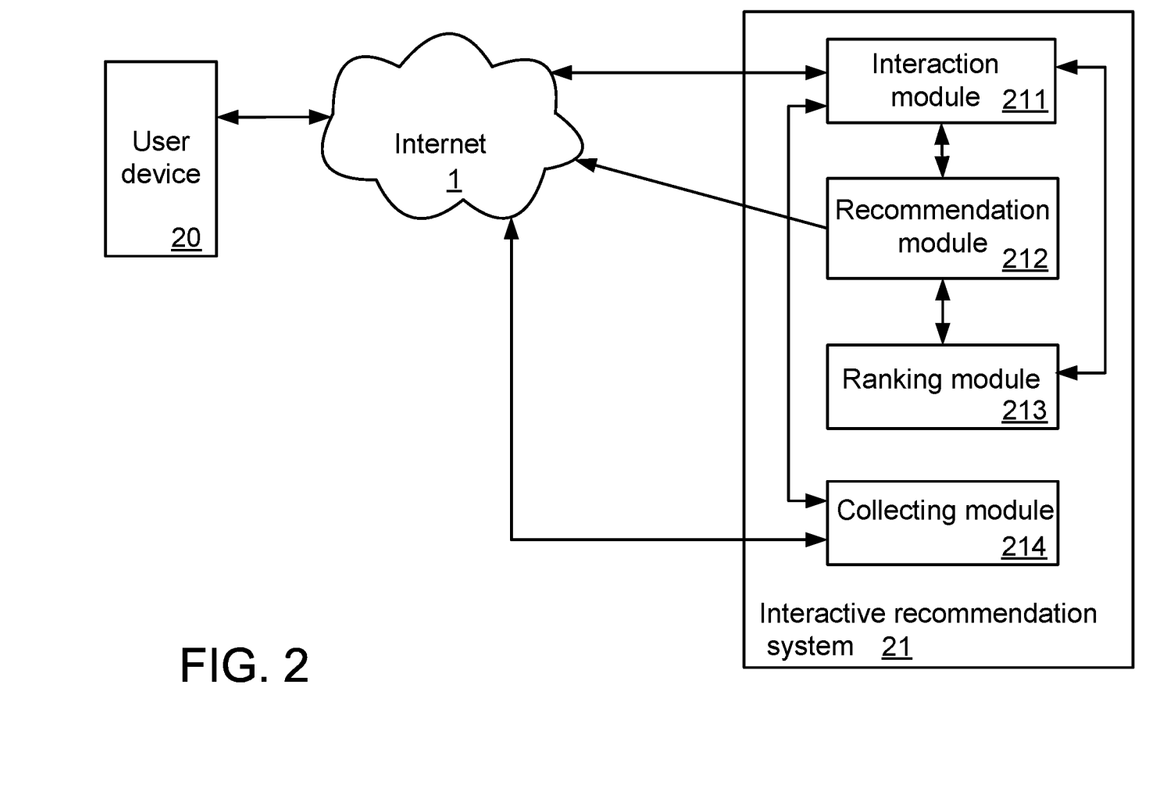
FIG. 2 schematically illustrates the architecture of an interactive recommendation system according to a first embodiment.

FIG. 2 schematically illustrates the architecture of an interactive recommendation system according to a first embodiment. The interactive recommendation system 21 is applied to one or more user devices 20 that are in communication with the Internet 1. An example of the user device 20 includes but is not limited to a personal computer, a smart phone or a tablet computer. In an embodiment, the interactive recommendation system 21 comprises an interaction module 211, a recommendation module 212, a ranking module 213 and a collecting module 214. The term "communication" used herein indicates that the information exchange is achieved through wired connection, wireless connection or optical communication.

The interaction module 211 is in communication with the Internet 1 for receiving a user request from the user device 20. After the user request is analyzed, the interaction module 211 generates at least one subsidiary request corresponding to the user request and issues an interactive request to the user device 20 according to the at least one subsidiary request.

In an embodiment, the user request received by the interaction module 211 is a sentence containing at least one keyword set. For example, the above illustrative sentence "I want to see Olympics in Rio Brazil" is an example of the user request. After the sentence is analyzed by the interaction module 211, two keyword sets "in Rio Brazil" and "see Olympics" are obtained. According to the keyword sets, the interaction module 211 generates the possible subsidiary requests, such as "Tickets Rio, Brazil", "Traffic information to Rio, Brazil" and "Accommodation information in Rio, Brazil".

The recommendation module 212 is in communication with the interaction module 211. According to the subsidiary requests, the recommendation module 212 generates a recommended application program list corresponding to the subsidiary requests. Moreover, after the user device 20 responds to the interactive request, the recommendation module 212 recommends at least one application program in the recommended application program list to the user device 20.

For example, the subsidiary requests include "Tickets Rio, Brazil", "Traffic information to Rio, Brazil" and "Accommodation information in Rio, Brazil". Moreover, an example of the interactive request includes "Ticket?", "Transportation?" or "Accommodation?".

After the user device 20 responds to the interactive request to the interaction module 211 and issues the confirmation message "yes", "flight" and "yes", the recommendation module 212 recommends at least one application program in the recommended application program list to the user device 20.

For example, in case that the subsidiary request is "Tickets Rio, Brazil", the application program recommended by the recommendation module 212 is an application program for buying the Olympics tickets. In case that the interactive request "Transportation?" and the confirmation message is "flight", the application program corresponding to the subsidiary request is an application program for booking flight tickets. In case that the interactive request "Accommodation?" and the confirmation message is "yes", the application program corresponding to the subsidiary request is an application program for booking an accommodation.

The ranking module 213 is in communication with the interaction module 211 and the recommendation module 212. After the recommended application program list corresponding to the subsidiary requests is generated by the recommendation module 212, the ranking module 213 ranks the recommended application program list according to a relativity. Moreover, the most relevant application program in the recommended application program list is recommended to the user device through the recommendation module 212. The relativity is calculated according to the similarity to the subsidiary request, the number of times the application program is downloaded, the user evaluation, the condition with or without advertising sponsorship or the combination thereof.

The collecting module 214 is in communication with the Internet 1 and the interaction module 211. The collecting module 214 is used for collecting the information about at least one operation with the Internet by the at least one user 20 and providing the information to the interaction module 211. The information includes the search action, the click action, the use time duration or the combination of the above information that is collected from the user device 20. The subsidiary request is obtained by analyzing the at least one information from the at least one behavior with users of a similar request and acquiring and merging the information into a common behavior. Generally, the source of the information to be analyzed by the collecting module 214 includes the operating histories of one or more users. Moreover, the operating histories of the plural users in a server are collected as subsidiary requests by the collecting module 214.

Similarly, "I want to see the Olympics in Rio Brazil" is an example of the user request. After the search action, the click action and the use time duration of the behavior of at least one user device 20 are collected and the at least one information from the at least one behavior of users with a similar request is analyzed, the collecting module 214 acquires and merges the information into a common behavior. Consequently, the actions of the subsidiary requests are generated. For example, the subsidiary requests include "Tickets Rio, Brazil", "Traffic information to Rio, Brazil" and "Accommodation information in Rio, Brazil".

From the above descriptions, the disclosure provides an interactive recommendation system and an interactive recommendation method. If the user request is more complex and the single application program cannot satisfy the user's need, the complex user request is divided into plural subsidiary requests according to the technology of the disclosure. Moreover, according to the human-machine interaction, a series of suitable application programs are recommended to satisfy the user's need. The concepts of the disclosure can be combined with the conventional speech recognition technology, natural language understanding technology and dialog management technology. Moreover, the concepts of the disclosure can be combined with the question answering dialogue technology and intelligent customer assistant technology. In other words, the interactive recommendation method of the disclosure provides a basic technology of the new generation human-machine interactive service.

Figure 3:
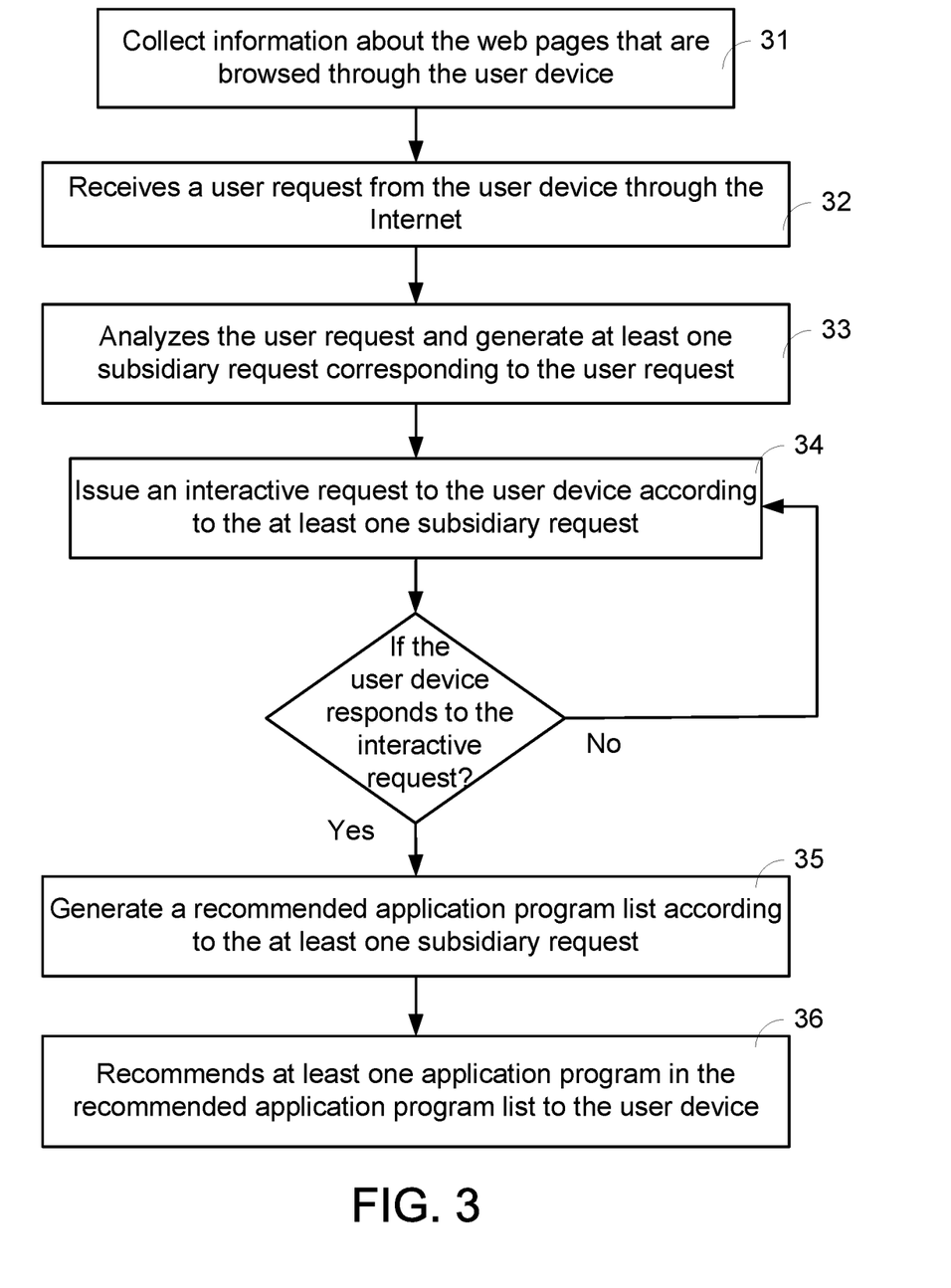
FIG. 3 is a flowchart illustrating an interactive recommendation method according to the first embodiment.

FIG. 3 is a flowchart illustrating an interactive recommendation method according to the first embodiment. The interactive recommendation method is applied to one or more user devices and a server through the Internet. An example of the user device includes but is not limited to a personal computer, a smart phone or a tablet computer. The server is a remote network system or a downloadable application program.

The interactive recommendation method comprises the following steps. Firstly, the server collects information about web pages that are browsed through the user device (Step 31). The information includes the search action, the click action, the use time duration or the combination thereof.

Then, the server receives a user request from the user device through the Internet (Step 32). In an embodiment, the user request is a sentence containing at least one keyword set. For example, the above illustrative sentence "I want to see Olympics in Rio Brazil" is an example of the user request.

Then, the server analyzes the user request and generates at least one subsidiary request corresponding to the user request (Step 33). After the sentence "I want to see Olympics in Rio Brazil" is analyzed by the server, two keyword sets "in Rio Brazil" and "see Olympics" are obtained. According to the keyword sets, the server generates the possible subsidiary requests such as "Tickets Rio, Brazil", "Traffic information to Rio, Brazil" and "Accommodation information in Rio, Brazil".

Then, the server issues an interactive request to the user device according to the at least one subsidiary request (Step 34). For example, the subsidiary requests include "Tickets Rio, Brazil", "Traffic information to Rio, Brazil" and "Accommodation information in Rio, Brazil". Moreover, an example of the interactive request includes "Ticket?", "Transportation?" or "Accommodation?".

Then, the server generates a recommended application program list corresponding to the subsidiary request according to the at least one subsidiary request (Step 35). After the user device responds to the interactive request, the server recommends at least one application program in the recommended application program list to the user device (Step 36).

After the user device responds to the interactive request to the interaction module and issues the confirmation message "yes", "flight" and "yes", the server recommends at least one application program in the recommended application program list to the user device. For example, the application program corresponding to the interactive request "Ticket" is an application program for buying the Olympics tickets, the application program corresponding to the confirmation message "flight" is an application program for booking flight tickets, and the application program corresponding to the interactive request "Accommodation?" is an application program for booking an accommodation.

After the recommended application program list corresponding to the subsidiary requests is generated, the recommended application program list is ranked according to a relativity. Moreover, the most relevant application program in the recommended application program list is recommended to the user device. The relativity is calculated according to the similarity to the subsidiary request, the number of times the application program is downloaded, the user evaluation, the condition with or without advertising sponsorship or the combination thereof. The subsidiary request is obtained by analyzing the at least one information from the at least one behavior of users with a similar request and acquiring and merging the information into a common behavior.

Similarly, "I want to see Olympics in Rio Brazil" is an example of the user request. After the search action, the click action and the use time duration of the browsed web pages of the user device are collected and the at least one information from the at least one behavior of users with a similar request is analyzed, the sever acquires and merges the information into a common behavior. Consequently, the actions of the subsidiary requests are generated. For example, the subsidiary requests include "Tickets Rio, Brazil", "Traffic information to Rio, Brazil" and "Accommodation information in Rio, Brazil".

Figure 4:
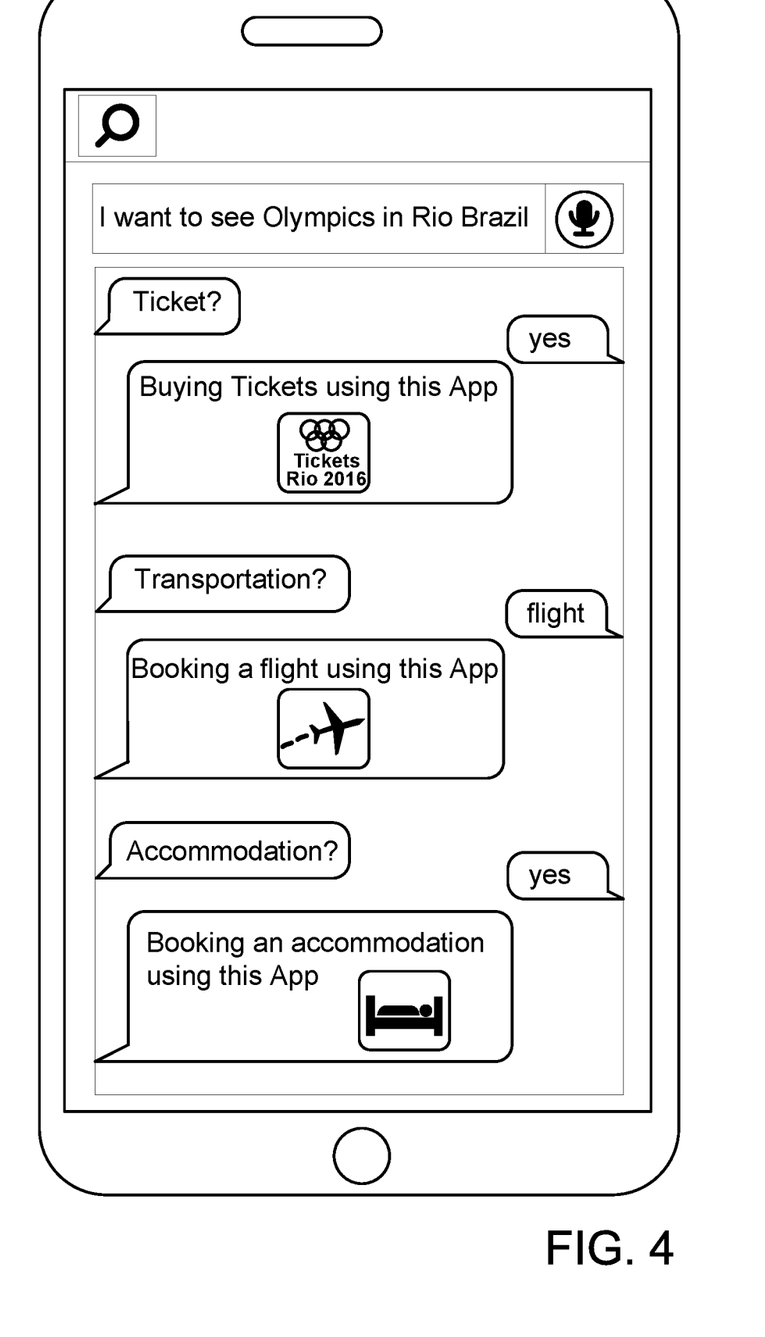
FIG. 4 schematically illustrates an interactive interface generated by the interactive recommendation method of the first embodiment.

FIG. 4 schematically illustrates an interactive interface generated by the interactive recommendation method of the disclosure. The application of the interactive recommendation method is not restricted to the above interactive recommendation system. That is, the system for implementing the interactive recommendation method of disclosure may be modified while retaining the teachings of the disclosure.

Figure 5:
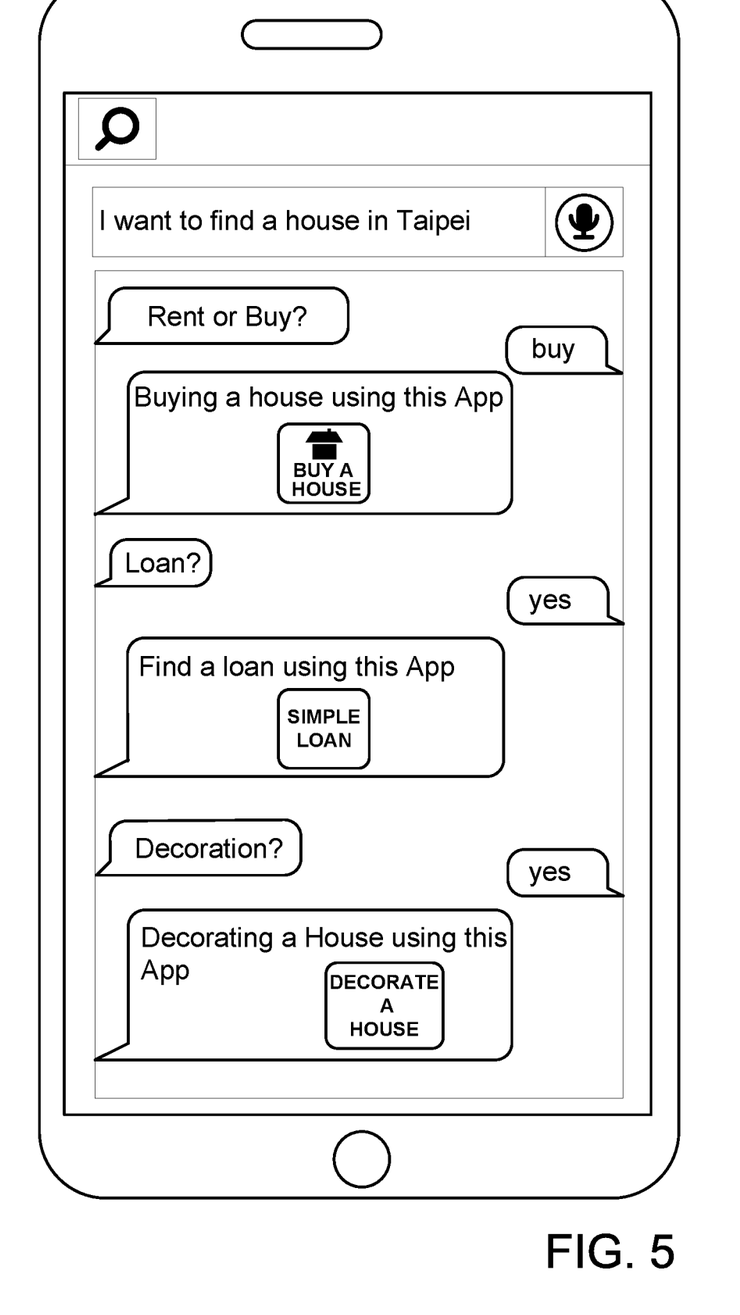
FIG. 5 schematically illustrates another interactive interface generated by the interactive recommendation method of the first embodiment.

FIG. 5 schematically illustrates another interactive interface generated by the interactive recommendation method of the disclosure.

In this embodiment, an illustrative sentence "I want to find a house in Taipei" is an example of the user request. After the sentence is analyzed by the interaction module 211, two keyword sets "in Taipei" and "find a house" are obtained. According to the keyword sets, the interaction module 211 generates the possible subsidiary requests, such as "Rent or buy a house", "Loan request" and "Decoration request".

According to the subsidiary requests, the recommendation module 212 generates a recommended application program list corresponding to the subsidiary requests. Moreover, after the user device 20 responds to the interactive request, the recommendation module 212 recommends at least one application program in the recommended application program list to the user device 20. For example, the subsidiary requests include "Rent or buy a house", "Loan request" and "Decoration request". Moreover, an example of the interactive request includes "Rent or Buy?", "Loan?" or "Decoration?".

After the user device 20 responds to the interactive request to the interaction module 211 and issues the confirmation message "buy", "yes" and "yes", the recommendation module 212 recommends at least one application program in the recommended application program list to the user device 20.

For example, in case that the subsidiary request is "Rent or buy a house", the application program recommended by the recommendation module 212 is an application program for buying houses. In case that the interactive request "Loan request" and the confirmation message is "yes", the application program corresponding to the subsidiary request is an application program for finding loans.

In case that the interactive request "Decoration request" and the confirmation message is "yes", the application program corresponding to the subsidiary request is an application program for decorating houses.

From the above descriptions, the disclosure provides an interactive recommendation system and an interactive recommendation method. If the user request is more complex and the single application program cannot satisfy the user's need, the complex user request is divided into plural subsidiary requests according to the technology of the disclosure. Moreover, according to the human-machine interaction, a series of suitable application programs are recommended to satisfy the user's need.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An interactive recommendation method for use with a user device and a server, the user device and the server being in communication with the Internet, the interactive recommendation method comprising steps of:

the server receiving a complex user request from the user device through the Internet, wherein the server is combined with a question answering dialogue technology;

the server obtaining at least one keyword set by analyzing the complex user request and generating a first subsidiary request and a second subsidiary request which are corresponding to the at least one keyword set;

collecting at least one information about at least one behavior that is operated through the user device, wherein the at least one information is acquired and merged into a common behavior;

the server issuing a first interactive request and a second interactive request, based on the question answering dialogue technology, to the user device, wherein the first interactive request is generated according to the first subsidiary request and the common behavior, and the second interactive request is generated according to the second subsidiary request and the common behavior; and the server generating a recommended application program list according to the first subsidiary request and the second subsidiary request, wherein after the user device responds to the first interactive request and the second interactive request, the server recommends at least one application program in the recommended application program list to the user device.

2. The interactive recommendation method as claimed in claim 1, wherein the complex user request is a sentence containing the at least one keyword set, wherein after the sentence is analyzed, the server acquires the at least one keyword set and generates the first subsidiary request and the second subsidiary request according to the at least one keyword set.

3. The interactive recommendation method as claimed in claim 1, wherein the recommended application program list is ranked according to a relativity, and the most relevant application program in the recommended application program list is recommended to the user device by the server.

4. The interactive recommendation method as claimed in claim 3, wherein the relativity is calculated according to a similarity to the first subsidiary request or the second subsidiary request, a number of downloaded times, a user evaluation, an advertising sponsorship, or a combination thereof.

5. The interactive recommendation method as claimed in claim 1, wherein the at least one information includes a search action, a click action, a use time duration or a combination thereof.

6. The interactive recommendation method as claimed in claim 1, wherein after the at least one information from at least one behavior of users with a similar request is analyzed, acquired and merged into the common behavior, the first subsidiary request and the second subsidiary request are generated.

7. The interactive recommendation method as claimed in claim 1, wherein after the user device responds to the first interactive request by issuing a first confirmation message and responds to the second interactive request by issuing a second confirmation message to the server, the server recommends the at least one application program in the recommended application program list to the user device.

8. The interactive recommendation method as claimed in claim 1, wherein the complex user request represents a user's request, which is incapable of being satisfied with a single application program.

9. An interactive recommendation system for use with a user device, the user device being in communication with the Internet, the interactive recommendation system comprising:
- an interaction module combined with a question answering dialogue technology and in communication with the Internet, wherein the interaction module receives a complex user request from the user device through the Internet, analyzes the complex user request to obtain at least one keyword set, generates a first subsidiary request and a second subsidiary request which are corresponding to the at least one keyword set, and issues a first interactive request and a second interactive request, based on the question answering dialogue technology, to the user device;
- a collecting module, in communication with the Internet and the interaction module, wherein the collecting module collects at least one information about at least one behavior that is operated through the user device, and the at least one information is merged into a common behavior, wherein the first interactive request is generated according to the first subsidiary request and the common behavior, and the second interactive request is generated according to the second subsidiary request and the common behavior; and
- a recommendation module in communication with the interaction module, wherein the recommendation module generates a recommended application program list according to the first subsidiary request and the second subsidiary request, wherein after the user device responds to the first interactive request and the second interactive request, the recommendation module recommends at least one application program in the recommended application program list to the user device.

10. The interactive recommendation system as claimed in claim 9, wherein the complex user request received by the interaction module is a sentence containing the at least one keyword set, wherein after the sentence is analyzed, the interaction module acquires the at least one keyword set and generates the first subsidiary request and the second subsidiary request according to the at least one keyword set.

11. The interactive recommendation system as claimed in claim 9, wherein the interactive recommendation system further comprises a ranking module, and the ranking module is in communication with the interaction module and the recommendation module, wherein the recommended application program list is ranked by the ranking module according to a relativity, and the most relevant application program in the recommended application program list is recommended to the user device through the recommendation module.

12. The interactive recommendation system as claimed in claim 11, wherein the relativity is calculated by the ranking module according to a similarity to the subsidiary request, a number of downloaded times, a user evaluation, an advertising sponsorship, or a combination thereof.

13. The interactive recommendation system as claimed in claim 9, wherein the at least one information includes a search action, a click action, a use time duration or a combination thereof.

14. The interactive recommendation system as claimed in claim 9, wherein after the at least one information from at least one behavior of users with a similar request is analyzed, acquired and merged into the common behavior, the first subsidiary request and the second subsidiary request are generated.

15. The interactive recommendation system as claimed in claim 9, wherein after the user device responds to the first interactive request by issuing a first confirmation message and responds to the second interactive request by issuing a second confirmation message to a server, the recommendation module recommends the at least one application program in the recommended application program list to the user device.

16. The interactive recommendation system as claimed in claim 9, wherein the complex user request represents a user's request, which is incapable of being satisfied with a single application program.

* * * * *